United States Patent
Letor et al.

(10) Patent No.: US 6,864,654 B1
(45) Date of Patent: Mar. 8, 2005

(54) METHOD AND RELATIVE CIRCUIT FOR DETECTING A TORQUE VARIATION OF AN ELECTRIC DC MOTOR

(75) Inventors: Romeo Letor, Mascalucia (IT); Giuseppe Di Caro, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 51 days.

(21) Appl. No.: 10/627,414

(22) Filed: Jul. 25, 2003

(30) Foreign Application Priority Data

Jul. 26, 2002 (EP) .......................................... 02425488

(51) Int. Cl.⁷ .............................................. H02K 17/32
(52) U.S. Cl. ...................... 318/434; 318/432; 318/433
(58) Field of Search ............................... 318/434, 283, 318/432, 433; 388/806, 930

(56) References Cited

U.S. PATENT DOCUMENTS

| | | | |
|---|---|---|---|
| 5,977,732 A | 11/1999 | Matsumoto | 318/283 |
| 2003/0009262 A1 * | 1/2003 | Colangelo et al. | 700/275 |
| 2003/0030950 A1 * | 2/2003 | Bruno | 361/23 |

FOREIGN PATENT DOCUMENTS

GB 2237658 5/1991 .......... E05F/15/16

* cited by examiner

*Primary Examiner*—Karen Masih
(74) *Attorney, Agent, or Firm*—Lisa K. Jorgenson; Allen, Dyer, Doppelt, Milbrath & Gilchrist, P.A.

(57) ABSTRACT

The method detects variations of the torque of a DC motor and is particularly suited for detecting an accidental block of the motor operation. The method includes generating a first signal representing the current flowing in the motor, multiplying the first signal with a pre-established function producing a product signal, generating a comparison signal to correspond to the slope of the product signal and signaling a torque variation if the comparison signal surpasses a certain threshold. The method is implemented by a control circuit for detecting a torque variation of an electric DC motor, including a sensor for the current flowing in the motor, and generating a first signal, a first circuit for generating a product signal of the first signal by a pre-established function, a second circuit for generating a comparison signal to correspond to the slope of the product signal, and a comparator of the comparison signal with a certain threshold, signaling a torque variation when the comparison signal surpasses the threshold.

23 Claims, 6 Drawing Sheets

METHOD AND RELATIVE CIRCUIT FOR DETECTING A TORQUE VARIATION OF AN ELECTRIC DC MOTOR

FIELD OF THE INVENTION

The present invention relates in general to motor driven devices, and more particularly to the detection of a torque variation of a reversible (direction of rotation) DC motor.

BACKGROUND OF THE INVENTION

In many applications of reversible electric motors for moving parts that may accidentally be blocked by various unpredictable causes, it may be necessary to detect the presence of an obstacle that stops the motion to protect either the motor and/or the transmission system from overloads that may damage them, or to prevent injuries when the obstacle is a part of the human body (for example a finger, a neck etc.). Examples include the detection of an accidental block of an electric motor dedicated to lift and lower a glass window of a car, a garage door and the like.

FIG. 1 schematically depicts a motorized car window system. The glass pane 2 of a door 1 of a car is moved by a DC motor 3 (M). The mechanical transmission 4 between the motor and the glass is sketched with a dashed line. The motor 3 is driven by a full-bridge stage 5, including four switches SW1, SW2, SW3 and SW4 that may be driven in pairs depending on the desired direction of rotation of the motor, and thus of the desired direction (up or down) of motion of the glass pane 2. The switches SW1 . . . SW4 are connected in series along the two parallel branches of the bridge, between the supply nodes 6 and 7. The switches SW1, SW3 are connected in series to form a first branch between the nodes 6 and 7, and the switches SW1 and SW4 are connected in series to form a second branch between the nodes 6 and 7. The motor 3 is connected to the intermediate nodes 8 and 9 of the two branches of the bridge. Depending from the configuration of the four switches, the current $I_M$ forced through the motor will circulate either in a direction or in the opposite direction determining the direction of rotation of the motor.

The switches SW1 . . . SW4 are driven by a control circuit 10 CTRL as a function of a start command (H/L) including the information of the desired direction of rotation. The control circuit 10 produces the four control phases for the respective switches SW1 . . . SW4. The bridge 5 and the circuit 10 are generally powered by a regulator 11 (REG) of the car battery (not depicted) voltage (Vbat) providing a regulated DC voltage Vcc. If required, the supply voltages of the bridge 5 and of the control circuit 10 may even be different.

Generally, the current $I_M$ flowing in the motor 3 is monitored and the instantaneous current information is input to the control circuit 10. In FIG. 1, the sensing of the current $I_M$ is indicated by an ampere meter symbol 12 in series with the motor 3. In practice, this sensing may be done on a sense resistor connected in series to one or to both branches of the bridge 5.

The instantaneous current information is used by the control circuit 10 to protect the motor against accidental overloads that may damage it. The current sensing may be substituted or associated to the sensing of the temperature of the motor to switch off electric supply when the temperature exceeds a certain limit. In any case, current and/or temperature sensing involve the fixing of thresholds and are generally unsuitable for sensing torque variations of the motor.

For instance, in a motorized window or door with automatic detection of the end of the run it may also be required to have a so-called "anti-pinch" function to prevent crushing with excessive force an accidental obstacle that could cause injury to a limb or other part of a human body. Such an anti-pinch function must also reverse the motion to open the window or door upon detecting a pinch to free the obstacle as quickly as possible.

A problem is that comparing the instantaneous current or speed with a threshold is not sufficient to create a reliable detection of an excessive torque. In effect, the motor current $I_M$ may vary for other causes than that of an obstacle blocking the movement of the part moved by the motor. For a DC motor it is possible to write the following relations:

$$V_M = L_M \cdot dI_M/dt + R_M \cdot I_M + E_M,$$

where $V_M$ is the supply voltage of the motor, $I_M$ is the current, $L_M$ is the inductance of the motor, $R_M$ is the resistance of the motor and $E_M$ is the back electromotive force;

$$E_M = k \cdot S_M,$$

where $S_M$ is the rotation speed of the motor and k is a constant;

$$K_M = k' \cdot I_M,$$

where $K_M$ is the motor torque and k' is a constant; and $$K_M - K_R = J_M \cdot d\Omega_M/dt,$$

where $K_R$ is the resisting torque, $\Omega_M$ is the speed of the motor and $J_M$ is the moment of inertia of the rotor.

The back electromotive force of the motor is thus directly proportional to the rotation speed thereof while the motor torque is directly proportional to the current. Except where expressly indicated, the word torque in the following description indicates the motor torque against the resisting torque representing the mechanical load (e.g. the weight of the glass window) plus the friction (of the edges of the glass pane sliding in the door guides).

FIG. 2 is a diagram showing the range of variation and the general characteristic of the current $I_M$ flowing in the motor when closing a car window by lifting it up to its end of run. For sake of simplicity, oscillations of the current due to noise (switchings of the motor brushes on the collector) are not shown. The curve 21 (solid line) illustrates a mean functioning, that is the closing of the glass pane under mean hygrometric and temperature conditions.

The user pushes a command button producing a close-window command that is sent to the controller 10. The switches SW1 and SW4 or SW2 and SW3, depending on the transmission, are turned on and the motor is powered. When the motor is switched on (instant t0) the current $I_M$ flowing in its windings increases though the speed is still null. The torque that is proportional to the current $I_M$ increases. At a time t1, the current $I_M$ drops because the motor is starting to rotate. The start of rotation reduces the torque and thus the absorbed current, until the time t2 when the current raises again. The instant t2 coincides with the moment at which the glass pane (initially wholly retracted inside the door) is braked by the horizontal gasket. Thereafter the torque and the current $I_M$ continue to increase but at slower rate during the lifting of the glass pane.

Upon approaching the end of the lift run current and torque drop because of the higher speed acquired by the glass pane and upon abutting against the upper glass edge receiving channel, at t4, the speed becomes zero and the torque increases abruptly. End of run detection is generally carried out via a position sensor that switches off the power to the motor with consequent drop to zero of the current. The curve 22 traced with short dashes represents the current (and thus the motor torque) in case of wet glass subjected to a reduced braking action by the gasket. The curve 23 traced with long dashes represents the case of iced glass. In this case, the torque necessary to lift the glass is definitely greater.

If a relatively yielding obstacle (for example, a wrist) interferes with the lift run of the glass pane, the run will be braked by the obstacle before being definitely stopped. The motor will decelerate more or less abruptly, which implies a drop of its back electromotive force and, as a consequence, a rise of the current for increasing the torque. In the absence of safeguard, an automatic lift of the glass could be dangerous. If a rigid (unyielding) obstacle is encountered, similar consequences are produced characterized by an instantaneous drop to zero of the rotation speed and thus a more abrupt increase of the torque.

A difficulty of reliably detecting a blocked condition or an abrupt deceleration is that for safety reasons the limit of tolerable compression of a limb or finger may correspond to or be even weaker than the required lifting force (accounting for the case of an iced glass window). Another difficulty is that the required lifting force may increase in time because of the aging of gaskets and linings and of progressive deformations of parts of the mechanism and of the window structure. Another difficulty is that abrupt variations of the motor torque stochastically occur when lifting the window pane, for example when the car is traveling a road with an irregular paving. In such an occurrence, illustrated by the dot and dashed peak 24 of the curve 21 of FIG. 2, the resisting torque increases abruptly when a wheel of the car rolls out of a pot hole. The torque and thus the current fall abruptly. When the wheel gets out of the hole, the inverse phenomenon is produced, that is the motor torque increases abruptly, and thus the current flowing in it.

For these reasons that render current monitoring approaches based on the fixing of thresholds hardly discriminating, other techniques have been proposed and are currently used. Typically, mechanical or electromechanical devices are used as anti-pinch sensors. Deformation of an elastic element between a mechanical detector and the moving glass, when a body is being pinched, is a known approach. This technique requires the use of an elastic conducting element of complex and costly installation.

Pinch detection may be performed by a switch fitted in a weather strip of the car window. The switch that is normally off switches on when the weather strip is subjected to a certain force. This approach is rather simple but the particular weather strip assembly implies a certain mounting complexity and maintenance may become necessary to maintain effectiveness. Moreover, in some cases this approach does not meet safety specifications. For instance, if the shape of the window determines a very slanted weather strip, a pinching force may not be applied in a direction sufficiently orthogonal to the strip, as shown in FIG. 3. Therefore, the pressure necessary to activate the switch may not be reached or may exceed the specified maximum value.

Alternative approaches are generally based on monitoring the motor speed by the use of speed sensors (Hall effect sensors, encoders, and alike). When a pinch condition occurs, the motor is blocked and its speed becomes zero. Therefore, a pinch condition causes an abrupt speed variation, that may be detected by speed sensors. Yet another known approach includes processing a number of operating parameter measurements such as temperature, supply voltage, motor speed and position of the motorized part for comparing the actual displacement of the moved part in respect to pre-established models. This approach requires a powerful calculator and a large number of sensors for measuring the parameters necessary for the calculations, besides the definition of particularly complex models in consideration of aging effects.

SUMMARY OF THE INVENTION

The present invention provides an effective technique for detecting an increase of the torque of a DC motor without the drawbacks of the prior art. Particularly, the present invention provides a reliable and simple anti-pinch system. The present invention overcomes the problems due to spurious abrupt variations of the motor torque that may be caused by other events rather than by an accidental pinching. The invention may be embodied in a relatively simple integrated circuit, without requiring specific external sensors.

The invention provides a method of detection of an increase of the motor torque particularly suited for detecting an accidental block of the motor operation. The method can recognize a blocking condition caused by a resisting force that may be weaker than the force necessary for activating the motor during other functioning conditions. The invention permits detection of a blocked condition (increase of the torque) even when the load of the motor is greater than the limit blocking force and even if the resisting force varies during the motion of the part driven by the motor even in the long term as it is often the case with the aging of parts.

More precisely, an object of the present invention is to provide a method for detecting variations of the torque of a DC motor, including generating a first signal representing the current flowing in the motor, multiplying the first signal with a pre-established function producing a product signal, generating a comparison signal to correspond to the slope of the product signal, and signaling a torque variation if the comparison signal surpasses a certain threshold. Preferably, the comparison signal is the difference between the product signal and the moving average thereof over a certain time interval $(t-\Delta t1; t)$.

Another object of the present invention is to provide a control circuit for detecting a torque variation of an electric DC motor, comprising sensor/sensing means for the current flowing in the motor, and generating a first signal; first circuit/means for generating a product signal of the first signal by a pre-established function; second circuit/means for generating a comparison signal to correspond to the slope of the product signal; and a comparator of the comparison signal with a certain threshold, signaling a torque variation when the comparison signal surpasses the threshold. Preferably, the second circuit/means comprises a low-pass filter of the product signal and an adder that produces the comparison signal as the difference between the product signal and the filtered replica thereof.

BRIEF DESCRIPTION OF THE DRAWINGS

The different aspects and advantages of the present invention will become even more evident through the following detailed description of embodiments thereof and by referring to the attached drawings, wherein.

DETAILED DESCRIPTION OF THE PREFERRED EMBODIMENTS

Figure 1:
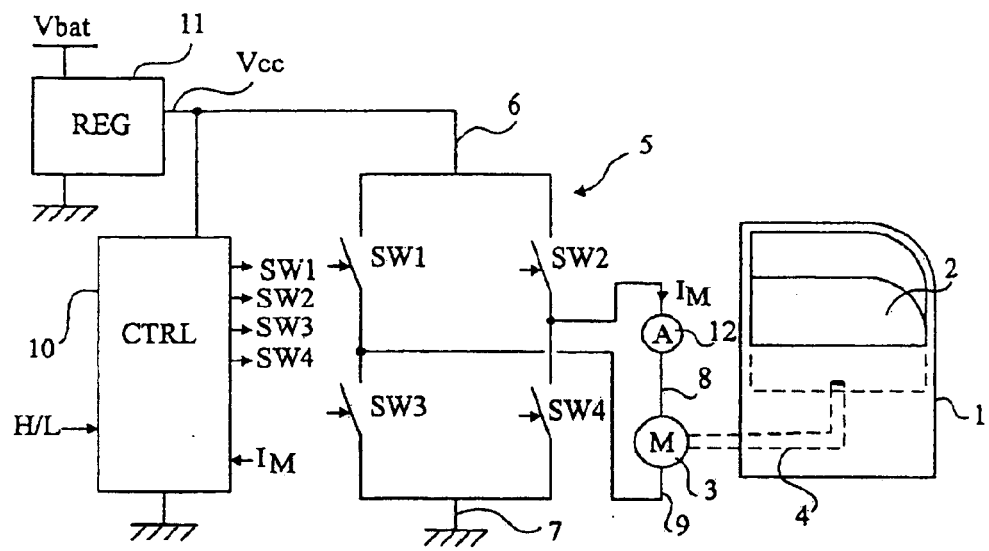
FIG. 1 is a schematic diagram of a motorized car window.

For sake of clarity, only the steps of the method and the components of the detection circuit of this invention that are necessary to fully understand the invention are depicted and described hereinbelow. In particular, the end-run detectors of a motorized window and the mechanical transmission components that are driven by the motor are not represented.

Substantially the method of the invention contemplates generating a signal representing the current flowing in the motor $I_M$, multiplying this signal by a certain function $W_{M\_}virtual(t)$ and generating a comparison signal corresponding to the slope of this product. The comparison signal is compared with a pre-established threshold, signaling a torque variation when the threshold is surpassed. The function $W_{M\_}virtual(t)$ is preferably a saturated linear ramp function, which is null when the motor is switched on and saturates when the start-up phase of the motor finishes. The advantages of choosing $W_{M\_}virtual(t)$ as a saturated linear ramp will be explained below.

Such a comparison signal could be generated for instance by deriving a substantially noise-free filtered replica of the product signal or, according to a preferred embodiment of the method of the invention, by subtracting from the product signal an integrated replica thereof. The time constant of integration may be chosen such to let the filtered replica signal track any torque variation that may occur during the normal functioning of the motorized implement but practically results insensible to torque variations due to the presence of an obstacle that blocks the motor. Preferably, the filtered replica is obtained by calculating the moving average of the product signal with an integrator over a time interval $(t-\Delta t1; t)$ whose duration $\Delta t1$ is greater than the maximum time constant of a torque variation to be ignored and smaller than the minimum time constant of a torque variation to be detected.

The duration $\Delta t1$ is chosen as a function of the yielding interval of a part of the human body. It has in fact been found that these yielding times typically last several tens of milliseconds, which makes possible even to discriminate the squeezing of a limb from other events. Preferably the signal representing the current in the motor is filtered with a low-pass filter with a time constant of about a millisecond. By doing so the switching noise of brushes and current variations that may be caused by running over pot holes in the carriageway are effectively filtered out and do not influence detection of torque variations due to the blocking of the motor.

According to a preferred embodiment, the function $W_{M\_}virtual(t)$ is a saturated linear ramp voltage. It could be possible to choose a constant function $W_{M\_}virtual(t)$, but in this case the system would recognize the inrush current of the motor as due to a pinch. In this case, the detection of torque variations should be disabled during the start-up phase of the motor, thus any pinching occurring during the start-up phase would not be detected.

Figure 4:
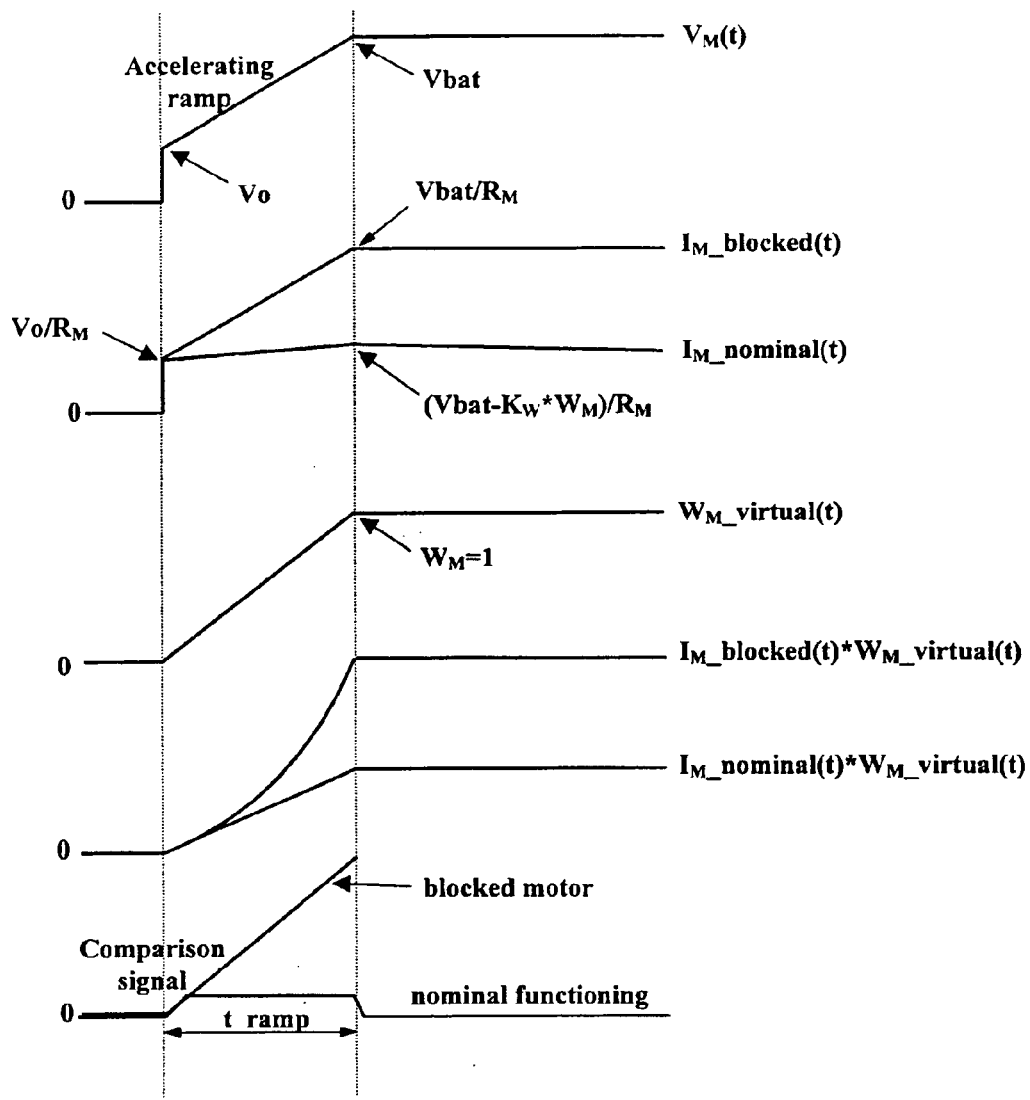
FIG. 4 are timing diagrams illustrating the working principle according to a preferred embodiment of the method of this invention.

With reference to FIG. 4, let us suppose that the motor is started-up with a saturating ramp voltage $V_M(t)$. If there is not any obstacle that blocks the motor, the current flowing in the motor is represented by the curve $I_{M\_}nominal(t)$, which is almost constant, otherwise in case of a blockage it is represented by the curve $I_{M\_}blocked(t)$. The product of the current $I_M$ flowing in the motor by the saturated linear ramp voltage $W_{M\_}virtual(t)$ is a saturated linear ramp $I_{M\_}nominal(t)*W_{M\_}virtual(t)$ if the motor is not blocked, otherwise it is a saturated parabolic ramp $I_{M\_}blocked(t)*W_{M\_}virtual(t)$ if an obstacle stops the motor during its start-up phase.

A comparison signal corresponding to the slope of the product signal is a linear ramp signal if the motor is blocked during the start-up phase, otherwise it is equal to a certain constant value. It should be noted that the slope of the product signal when the motor is not blocked is relatively small, because the current in the motor is almost constant. On the contrary, when the motor is blocked the slope of the product signal rises rapidly to large values. This is exploited for discriminating a normal start-up condition from a blocked start-up condition by comparing the comparison signal with a certain voltage threshold.

As it will be evident to the skilled person, the inrush of current at the start-up does not produce any false blockage detection because the function $W_{M\_}virtual(t)$ is null when the motor is switched on, and thus it effectively masks the initial abrupt variation of the current $I_M$. When the start-up phase finishes, the saturating ramp voltage $W_{M\_}virtual(t)$ becomes a constant (e.g. equal to 1) and thus the product signal corresponds to the current in the motor $I_M$. Therefore, after the start-up phase the method of the invention substantially contemplates detecting torque variations from variations of the current in the motor.

It is worth noting that using the method of the invention it is possible to detect a blocked condition even when the glass pane is blocked at the turn on of the motor. This cannot be done with known methods that contemplate the use of Hall sensors because these methods are based on the detection of variations of the motor speed.

Figure 5:
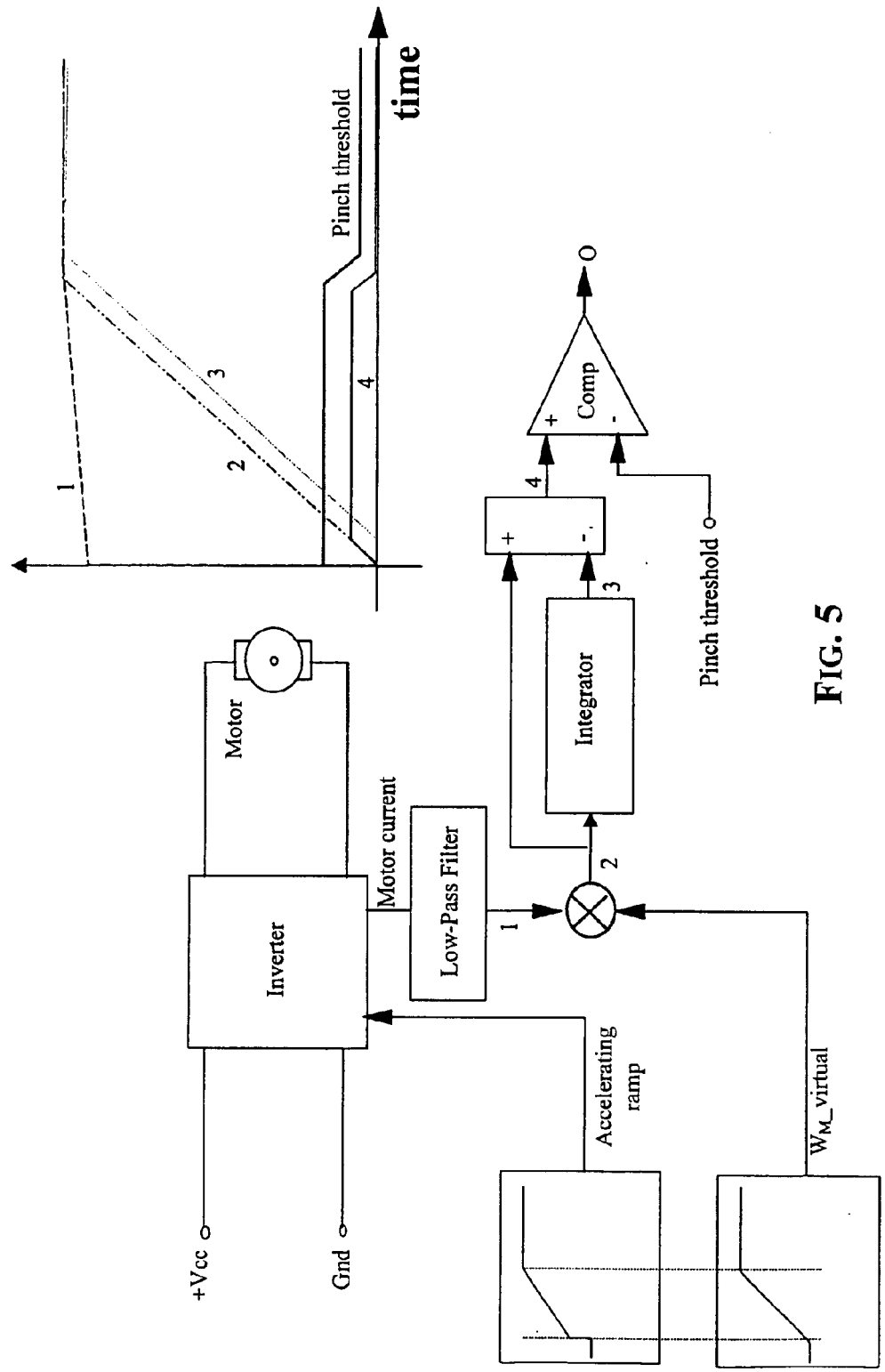
FIG. 5 is a schematic diagram of an embodiment of the control circuit of this invention.

A control circuit of the invention for detecting the abrupt speed variation of the motor due to a blocked condition by monitoring the current circulating in the motor, is depicted in FIG. 5. A current sensor, not depicted in figure and that may be of any type as commonly employed for this purpose, generates a signal representative of the current circulating in the motor. An optional Low-Pass filter generates a noise-free replica 1 of the signal representative of the current in the motor, a multiplier generates the product signal 2 and an integrator produces a moving average 3 of the product signal. The integrator filters the variations of the filtered signal the characteristics of which make them attributable to an obstacle, and generates the signal 3. Finally, an adder generates the comparison signal 4 as the difference between the product signal 2 and the moving average thereof 3. The logic signal 5 produced by the comparator is active when the comparison signal 4 exceeds the threshold, signaling that a torque variation has been detected.

The comparator COMP compares the signal 4 with a pre-established threshold PINCH_THRESHOLD that when is exceeded generates a comparison signal that signals that an obstacle is blocking the run of the motor. Variations of current due to strains of the glass pane guides or to particularly low temperature, humidity and dirt typically cause a relatively slow variation of the motor current that is very well discriminated from fast variations due to the presence of a block obstacle.

Figure 6:
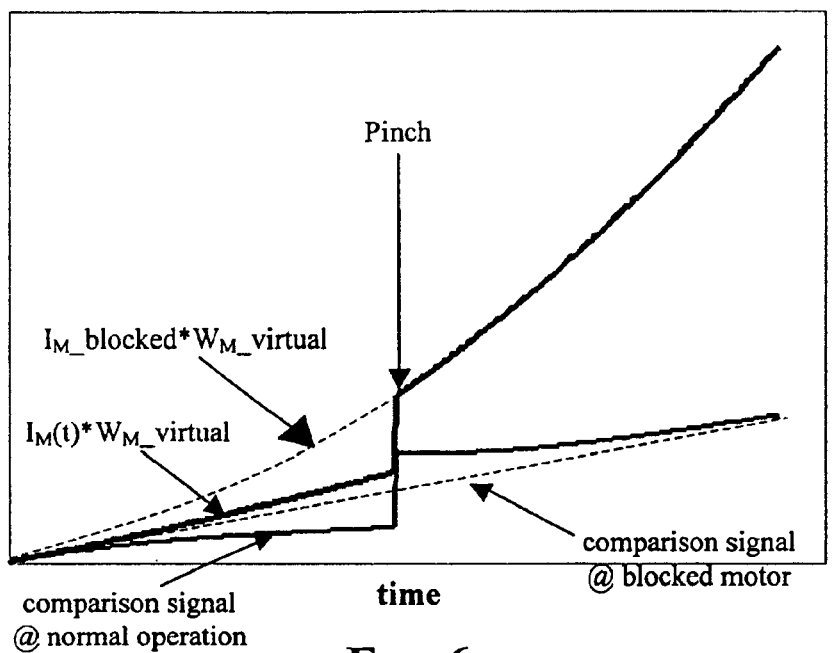
FIG. 6 is a timing diagram illustrating how the product signal and the comparison signal change when a pinch occurs.

FIG. 6 depicts in a schematic manner the evolution of the product signal and of the comparison signal when a pinch occurs. Before the pinch, the product signal is a linear ramp and the comparison signal assumes relatively small values. When a pinch occurs, the current, and thus the product signal, increase rapidly according to a typical parabolic curve, while the comparison signal increases following a linear ramp.

Figure 7:
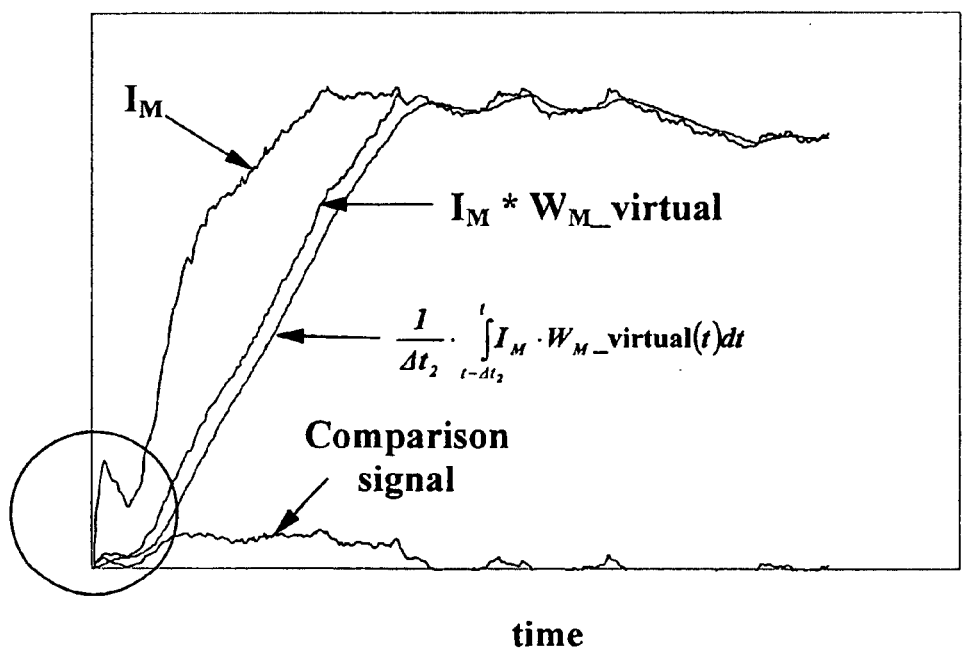
FIG. 7 is a timing diagram of the main signals of the control circuit of FIG. 5.

Diagrams of the main signals of the circuit of FIG. 5 during a normal run of the motor, are depicted in FIG. 7. The initial current peak due to clearances in the transmission components does not produce sensible variations of the comparison signal. After the start-up of the motor (from t0 to t2 in FIG. 2) and neglecting spurious disturbances and switching noise, the product signal is proportional to the current $I_M$ flowing in the motor and the mean value thereof do not change considerably for different functioning condition (wet, dry or iced glass). Indeed, different operating conditions cause similar variations of the mean value of the respective curve. Moreover, current (torque) variations during normal functioning are significantly slower than a variation caused by the accidental blocking of the motor.

More generally, for the same travel between two positions, slow variations of the resisting torque (when an additional constant force is applied) for example under certain conditions of humidity, temperature, and the like, modify negligibly the motor torque in respect to the mean value of these rather slow variations of the resisting torque. Therefore, from an assessed maximum variation during normal functioning, it is possible to determine a proper duration $\Delta t1$ of integration for calculating the moving average, for example, by considering the maximum variation as the acceptable limit.

Figure 8A:
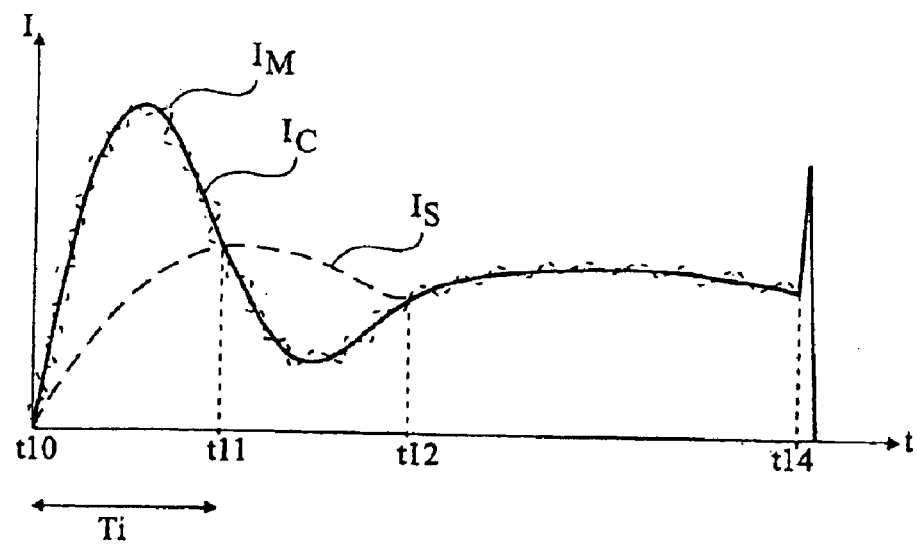
FIGS. 8a and 8b are timing diagrams illustrating the operation of a control circuit of this invention in a normal and in a blocked condition of a motorized car window.
Figure 8B:
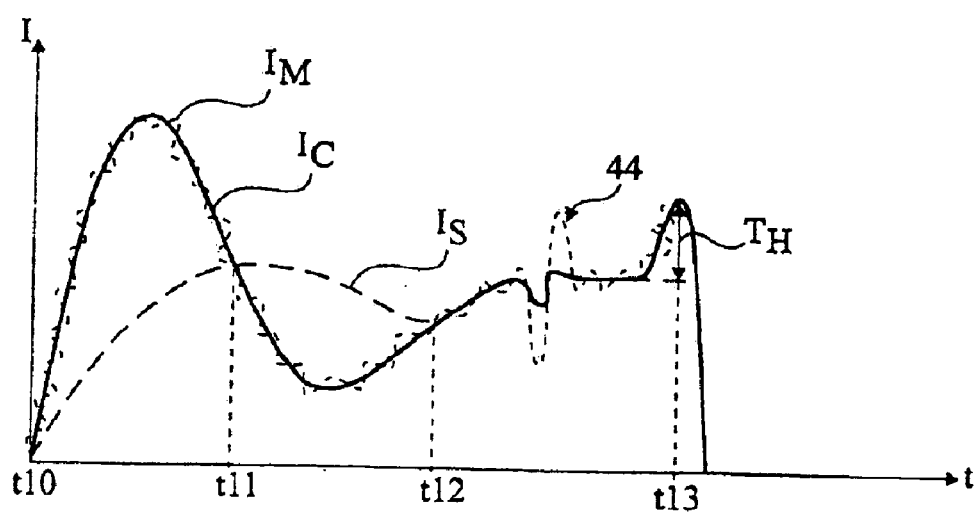

FIG. 8a illustrates the waveform of different signals of a motorized window in absence of accidental blocking of the motor. FIG. 8b illustrates the same waveforms in the case of an accidental blocking of the motor while lifting the window closed. In FIGS. 8a and 8b, the instantaneous value of the current in the motor $I_M$ is represented by the curve traced with short dashes. The curve of $I_C$ (which is a noise filtered replica of the current $I_M$) is traced with a solid line. The waveform of the moving average $I_S$ of the current in the motor is traced with long dashes.

Figure 2:
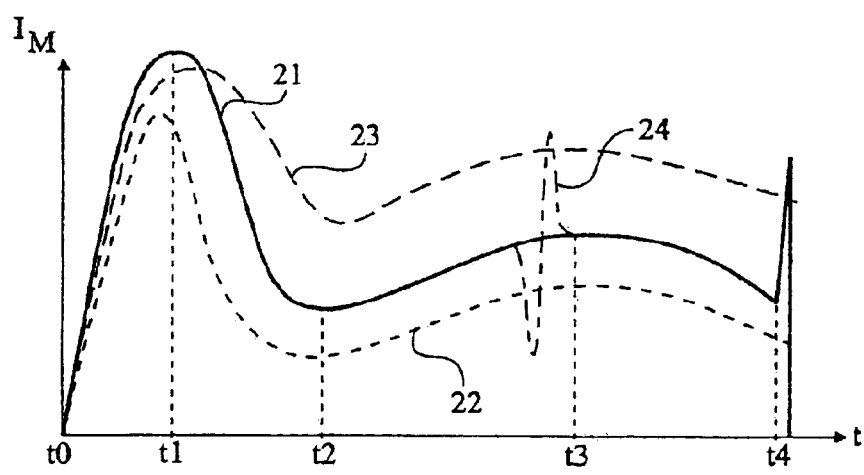
FIG. 2 is a timing diagram of the current through the motor.
Figure 3:
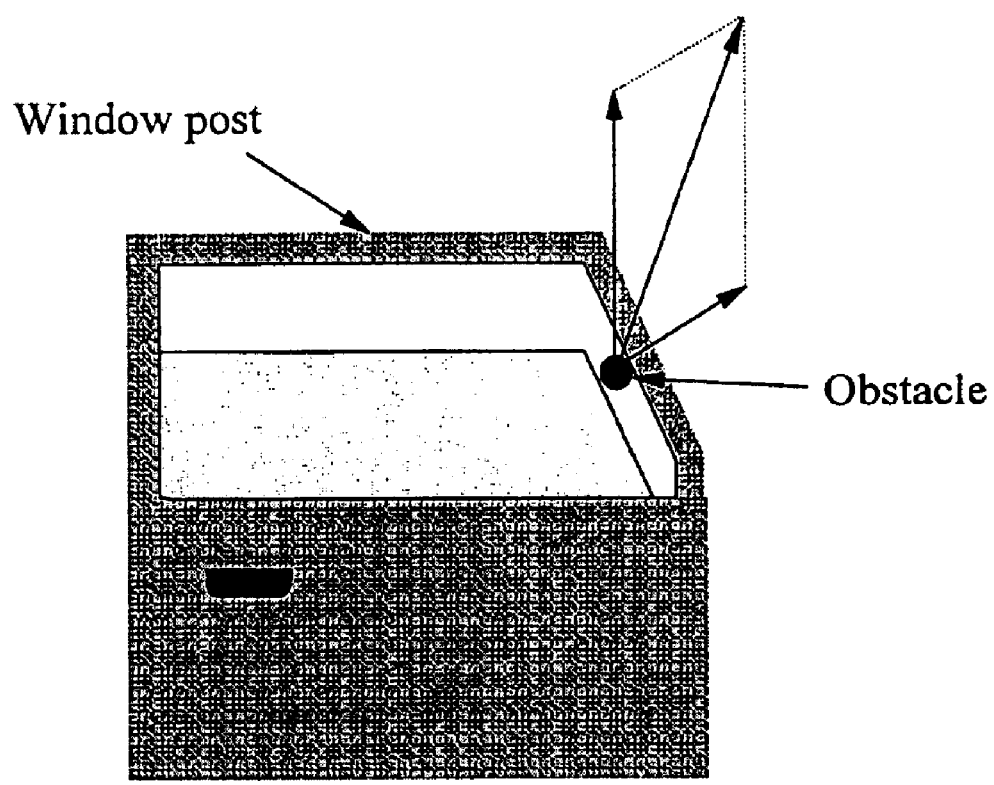
FIG. 3 is a schematic diagram of the motorized glass pane of the window of a car door including force exerted on an obstacle trapped between the closing glass and a window post.

The curve $I_C$ of FIG. 8a is similar to the already described curve 21 of FIG. 2. The curve $I_S$ raises slower than $I_C$ and crosses it at an instant t11 successive to the inversion of the slope of the signal $I_C$ after the start of the rotation of the motor. After the instant t11, the curves $I_C$ and $I_S$ coincide at the instant t12 during normal operating conditions of the motor and remain identical as long as the window is eventually shut (peak at the instant t14).

The detection of torque variation is disabled upon reaching the end of the run when the close shut condition is detected by commonly used end run detectors (at the instant t14). If the glass window is blocked while being lifted (instant t13 of FIG. 8b), the curve $I_C$ increases faster than the curve of the moving average $I_S$. When the difference between the two curves reaches the pre-established threshold value PINCH_THRESHOLD, a torque variation is detected. An instantaneous drop to zero of the current circulating in the motor is depicted in FIG. 8b. This drop to zero of the current is due to an inversion of the direction of the current (not depicted) following a command for pulling down the glass pane. In case of detection of a pinching it is not sufficient to stop the motor but it is necessary to reverse the motor and to pull down immediately the glass pane for freeing the trapped part of the body.

A feature of the method of the present invention is that the pinching value, which is fixed (pinch_threshold), is independent from the level of current in the motor. Therefore, the functioning of an anti-pinch system or more generally of a circuit for detecting a torque variation according to this invention, is not affected by the current value of the torque. This means that, independently from the lifting speed of the glass pane, it is possible to stop any pinching in a very short time. Theoretically, it would be possible to fix a null pinch threshold, so that even the smallest difference would be detected. In practice, the threshold is fixed for a pinching force as weak as possible in consideration of tolerances of the constituting elements of stabilization times of the quantities to be compared. In particular the pinch threshold may be chosen such to correspond to a tolerable pinching force.

Another feature of the present invention is that even abrupt variations of the torque are ignored as long as they do not last. This phenomenon is represented in FIG. 8b by the peak 44 of the signal $I_M$, representing the abrupt current variation caused by the passage of the car on a pot hole while lifting the glass pane. Because of the shortness of the phenomenon, the signal $I_S$ does not vary. Because of the chosen time constant the peak 44 may cause a small variation of $I_C$ as depicted in FIG. 8b. This variation besides having a transient character has also a rather small amplitude and thus the discriminating threshold PINCH_THRESHOLD is not reached and thus there is no detection of a pinching.

Yet another feature of the method of the present invention is that a pinching condition may be detected even if the blocked condition is not followed by a yielding. According to the described embodiment of a motorized window, this represents the case in which the blockage of the glass pane is caused by a trapped finger. Even in such an occurrence it will be necessary to free the trapped finger by reversing the motor for pulling down the glass pane. Though the variation of the instantaneous signal $I_M$ is not followed immediately by a variation of the signal $I_C$ (the peak is not detected, because it is filtered by the integrator 32), the blocked condition persists and therefore the signal $I_C$ eventually increases, thus causing the detection of a blocked condition because $I_C$ increases before the signal $I_S$.

According to this invention, it is not necessary to use sensors of operating parameters of the motor or other external transducers. The current sensing that is normally performed for controlling the motor is perfectly sufficient also for the aims of torque variation detection of this invention.

The present invention may be practiced in forms even different from those described for illustrating purposes, as will appear to the skilled person. In particular, selection of the duration $\Delta t1$ and of the time constant T2 of the noise filter may be easily done by the skilled person on the basis of the indications given in this description, to suit the particular application. In case of a motorized car window, the duration $\Delta t1$ may be comprised between 10 and 200 milliseconds and the time constant T2 may be comprised between 0.5 and 10 milliseconds.

Though the invention has been illustrated in relation to an important sample application of a motorized car window, it is applicable to any other kind of implement motorized with a DC motor whenever it is desirable to detect a blocked condition, or a more or less abrupt increase of the motor torque. For example, the invention may be applied to automated doors, gates, as well as to motorized conveyors and the like.

That which is claimed is:

1. A method for detecting variations of the torque of a DC motor, comprising:

generating a first signal representing the current flowing in the motor;

multiplying the first signal with a pre-established function to produce a product signal;

generating a comparison signal to correspond to a slope of the product signal; and signaling a torque variation if the comparison signal surpasses a certain threshold.

2. The method of claim 1, wherein the comparison signal is the difference between the product signal and a moving average thereof over a certain time interval.

3. The method of claim 2, wherein a duration of the time interval is greater than a maximum time constant of torque to be ignored and smaller than a minimum time constant of torque to be detected.

4. The method of claim 1, wherein the pre-established function is a saturated linear ramp function, which is null when the motor is switched on and saturates when a start-up phase of the motor ends.

5. The method of claim 3, wherein the duration ranges between 10–200 milliseconds.

6. The method of claim 1, further comprising filtering noise from the first signal before multiplying it with the pre-established function.

7. The method of claim 6, wherein filtering comprises filtering the first signal with a low-pass filter having a time constant in a range between 0.5–10 milliseconds.

8. The method of claim 1, further comprising accelerating the motor during a start-up phase by supplying it with a linear saturating ramp voltage.

9. A method for detecting a blocked condition of a DC motor, comprising:

detecting an increase of motor torque by generating a first signal representing the current flowing in the motor, multiplying the first signal with a pre-established function to produce a product signal, generating a comparison signal to correspond to a slope of the product signal, and signaling a torque variation if the comparison signal surpasses a certain threshold; and signaling a blocked condition when an increase of the motor torque is detected.

10. The method of claim 9, wherein the comparison signal is the difference between the product signal and a moving average thereof over a certain time interval.

11. The method of claim 10, wherein a duration of the time interval is greater than a maximum time constant of torque to be ignored and smaller than a minimum time constant of torque to be detected.

12. The method of claim 9, wherein the pre-established function is a saturated linear ramp function, which is null when the motor is switched on and saturates when a start-up phase of the motor ends.

13. The method of claim 11, wherein the duration ranges between 10–200 milliseconds.

14. The method of claim 9, further comprising filtering noise from the first signal before multiplying it with the pre-established function.

15. The method of claim 14, wherein filtering comprises filtering the first signal with a low-pass filter having a time constant in a range between 0.5–10 milliseconds.

16. The method of claim 9, further comprising accelerating the motor during a start-up phase by supplying it with a linear saturating ramp voltage.

17. A control circuit for detecting a torque variation of an electric DC motor, comprising:

sensing means for sensing the current flowing in the motor and generating a first signal;

first circuit means for generating a product signal of the first signal and a pre-established function;

second circuit means for generating a comparison signal to correspond to a slope of the product signal; and a comparator to compare the comparison signal with a threshold, and signal a torque variation when the comparison signal surpasses the threshold.

18. The control circuit of claim 17, wherein said first circuit means comprises a low-pass filter that outputs a noise filtered replica of the first signal.

19. The control circuit of claim 18, wherein the low-pass filter generates the noise filtered replica signal to correspond to a moving average of the first signal and has a time constant that ranges between 0.5–10 milliseconds.

20. The control circuit of claim 17, wherein said second circuit means comprises a low-pass filter to filter the product signal, and an adder that generates the comparison signal as the difference between the product signal and the filtered product signal.

21. The control circuit of claim 20, wherein the low-pass filter generates the filtered product signal as a moving average thereof over a time interval having a duration greater than a maximum time constant of a torque to be ignored and smaller than a minimum time constant of a torque to be detected.

22. The control circuit of claim 21, wherein the duration ranges between 10–200 milliseconds.

23. The control circuit of claim 20, wherein the first circuit means comprises:

a waveform generator of a saturated linear ramp signal which is null when the motor is switched on and saturates when a start-up phase of the motor ends; and a multiplier receiving the linear saturating ramp signal and the first signal, and generating the product signal.

* * * * *